United States Patent
Popp et al.

(10) Patent No.: US 6,170,866 B1
(45) Date of Patent: Jan. 9, 2001

(54) CONTROL SYSTEM FOR AN AIR BAG WITH CHILD SEAT DETECTION AND SEAT POSITION DETECTION

(75) Inventors: Peter Popp, Regensburg; Günter Heitzer, Pfatter; Ralf-Johannes Lenninger, Donaustauf, all of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/316,478

(22) Filed: May 21, 1999

Related U.S. Application Data

(63) Continuation of application No. PCT/DE97/02727, filed on Nov. 20, 1997, now abandoned.

(30) Foreign Application Priority Data

Nov. 21, 1996 (DE) .............................................. 196 48 267

(51) Int. Cl.⁷ .................................................. B60R 21/32
(52) U.S. Cl. .......................................... 280/735; 180/271
(58) Field of Search ............................ 280/735; 180/271, 180/273

(56) References Cited

U.S. PATENT DOCUMENTS

| | | | |
|---|---|---|---|
| 5,413,378 | 5/1995 | Steffens, Jr. et al. | |
| 5,454,591 | * 10/1995 | Mazur et al. | 280/735 |
| 5,460,405 | 10/1995 | Faigle et al. | |
| 5,610,817 | * 3/1997 | Mahon et al. | 364/424.056 |
| 5,618,056 | 4/1997 | Schoos et al. | 280/735 |
| 5,785,347 | 7/1998 | Adolph et al. | 280/735 |
| 5,803,491 | * 9/1998 | Barnes et al. | 280/735 |
| 5,941,560 | * 8/1999 | Wolfram | 280/735 |
| 6,007,094 | 12/1999 | Hosado | 280/735 |

FOREIGN PATENT DOCUMENTS 0 738 633 A1   10/1996   (EP) .

* cited by examiner

*Primary Examiner*—Lanna Mai
*Assistant Examiner*—Ruth Ilan
(74) *Attorney, Agent, or Firm*—Herbert L. Lerner; Laurence A. Greenberg; Werner H. Stemer

(57) ABSTRACT

A control apparatus for a restraint device in a motor vehicle has a detector for detecting a child seat disposed on a vehicle seat, a pickup for determining the position of the vehicle seat, and an evaluation device. The evaluation device furnishes a control signal for the restraint device as a function of the vehicle seat position and as a function of a status signal of the detector for detecting a child seat.

15 Claims, 2 Drawing Sheets

| P | s1 | y |
|---|---|---|
| * | 0 | 1 |
| $P \geq P_{s2}$ | 1 | 1 |
| $P < P_{s2}$ | 1 | 0 |

II)

| P | s2 | s3 | s4 | y |
|---|---|---|---|---|
| * | 0 | 0 | 0 | 1 |
| $P > P_{s1}$ | 1 | 0 | 0 | 1 |
| $P > P_{s2}$ | 0 | 1 | 0 | 1 |
| $P < P_{s1}$ | * | * | * | 0 |
| * | * | * | 1 | 0 |

CONTROL SYSTEM FOR AN AIR BAG WITH CHILD SEAT DETECTION AND SEAT POSITION DETECTION

CROSS-REFERENCE TO RELATED APPLICATION

This application is a continuation of International Application No. PCT/DE97/02727, now abandoned filed Nov. 20, 1997, which designated the United States.

BACKGROUND OF THE INVENTION

FIELD OF THE INVENTION

The present invention relates to a control apparatus for a restraint device in a motor vehicle.

Modern control apparatuses for restraint devices in motor vehicles, by using suitable sensors, detect not only whether a collision forceful enough that the restraint device should be triggered is occurring, but also whether a child seat has been placed on the front passenger seat. If a child seat on the front passenger seat is detected, then the inflation of an air bag for front-impact protection installed in front of the front passenger seat, or of an air bag for side-impact protection installed to the side of the front passenger seat, is either averted or sharply reduced. If an air bag disposed in the vicinity of a child seat is inflated without restriction, the child sitting in the child seat can possibly be injured severely. Numerous devices for detecting a child seat disposed on a vehicle seat have therefore already been proposed.

From Published, European Patent Disclosure EP 0 708 002 A1, corresponding to U.S. Pat. No. 5,618,056 which is hereby incorporated by reference, a control apparatus with a child seat detecting device is known what has one transmitting and one receiving antenna, each disposed in the vehicle seat. If a child seat equipped with a transponder/resonator is placed on a thus-prepared vehicle seat, then its presence is detected. The detection occurs via a transmitting antenna in which an exciter field is output that is picked up by the transponder, modified in a characteristic way, and transmitted back to the vehicle seat. The measurement field picked up by the receiving antenna is examined for the presence of the signal characteristic for the presence of the transponder. If a child seat disposed on the vehicle seat is detected, an impact-detecting control device that trips restraint devices is influenced in such a way that a signal for tripping the restraint device is blocked.

If the child seat is provided with two transponders and if the vehicle seat has two transmitting antennas and two receiving antennas, then from the mere detection of a child seat, the orientation of the child seat can be ascertained. A forward-facing child seat disposed on the vehicle seat can thus be distinguished from a rear-facing child seat on the vehicle seat, whose backrest thus faces the dashboard. Tripping of the restraint device can be varied depending on the orientation of the child seat. For instance, if a forward-facing child seat is detected, tripping can be allowed, while for a rear-facing child seat tripping is prevented.

Tripping of the restraint device is influenced by the known control apparatus solely as a function of the detection of a forward-facing or rear-facing child seat, and hence on the basis of only a few parameters. Under certain preconditions, tripping will therefore be prevented even when tripping would do more good than harm to the child in the child seat.

From U.S. Pat. No. 5,413,378, a control apparatus for a restraint device in a motor vehicle is known which has a weight sensor disposed in the vehicle seat. Various pickups (i.e. sensors) for vehicle seat settings, such as one pickup for the position of the vehicle seat and one pickup for the angle of inclination of the seat back, and ultrasonic sensors can also be used. Depending on the position of a passenger as detected by the sensors, the inflation of an air bag is done in metered fashion. For instance, if a passenger who is sitting far forward toward the dashboard is detected, the air bag is inflated only slightly, or in other words with a small volume of gas.

SUMMARY OF THE INVENTION

It is accordingly an object of the invention to provide in a control apparatus for a restraint device in a motor vehicle which overcomes the above-mentioned disadvantages of the prior art devices of this general type, which provides differential assessment as to whether a restraint device can be allowed to be activated even though a child seat is disposed on the vehicle seat.

With the foregoing and other objects in view there is provided, in accordance with the invention, a control apparatus for a restraint device in a motor vehicle, including:

a detector for detecting a child seat disposed on a vehicle seat and outputting a status signal;

a pickup for determining a position of the vehicle seat; and an evaluation device generating a control signal in dependence on the position of the vehicle seat and in dependence on the status signal furnished by the detector, the control signal to be logically linked with a triggering signal output by an impact-detecting control device for triggering a restraint device.

The control apparatus accordingly furnishes a control signal that is dependent on a status signal of the detector for detecting a child seat and at the same time on the position of the vehicle seat, as detected by a suitable pickup. If the position of the vehicle seat is included in the decision whether to trip the restraint device, then the restraint device can be tripped appropriately as needed. For instance, if the vehicle seat is latched in its farthest-forward position, that is, extremely close to the dashboard, then if a child seat is detected, tripping of the restraint device is prevented, regardless of the detected orientation of the child seat on the vehicle seat. If a vehicle seat is in its rearward position, that is, close to the back seats, then inflation of the restraint device may be harmless to the child even in a rear-facing child seat on the vehicle seat. For instance if the inflated air bag has only a small volume and even in the fully deployed state, naturally in the absence of a collision, does not touch the backrest of the rear-facing child seat. In this case, if there is an accident, the child seat can be prevented by the air bag from shooting toward the dashboard in response to the impact, and the child in the child seat can be protected against the consequences of striking the dashboard. The same is true for a forward-facing child seat.

With the control apparatus of the invention, a sensitively adapted tripping strategy with regard to the restraint device is assured, in a way that provides the best possible protection of the child in the child seat. If inflating the air bag is classified as harmless, then the child is protected by the air bag; if inflating the air bag is classified as dangerous to the child, then injury to the child that would be caused by inflating the air bag is averted. Moreover, this substantial improvement over known control apparatuses requires only little use of components; for instance, in electrically adjustable vehicle seats, there is already a pickup for the position of the vehicle seat. The signal of the pickup can accordingly be evaluated twice, once for the electrical seat adjustment and a second time for the proposed control apparatus for the restraint device.

Other features which are considered as characteristic for the invention are set forth in the appended claims.

Although the invention is illustrated and described herein as embodied in a control apparatus for a restraint device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a truth table with signals of the control apparatus.

DESCRIPTION OF THE PREFERRED EMBODIMENTS

Figure 1:
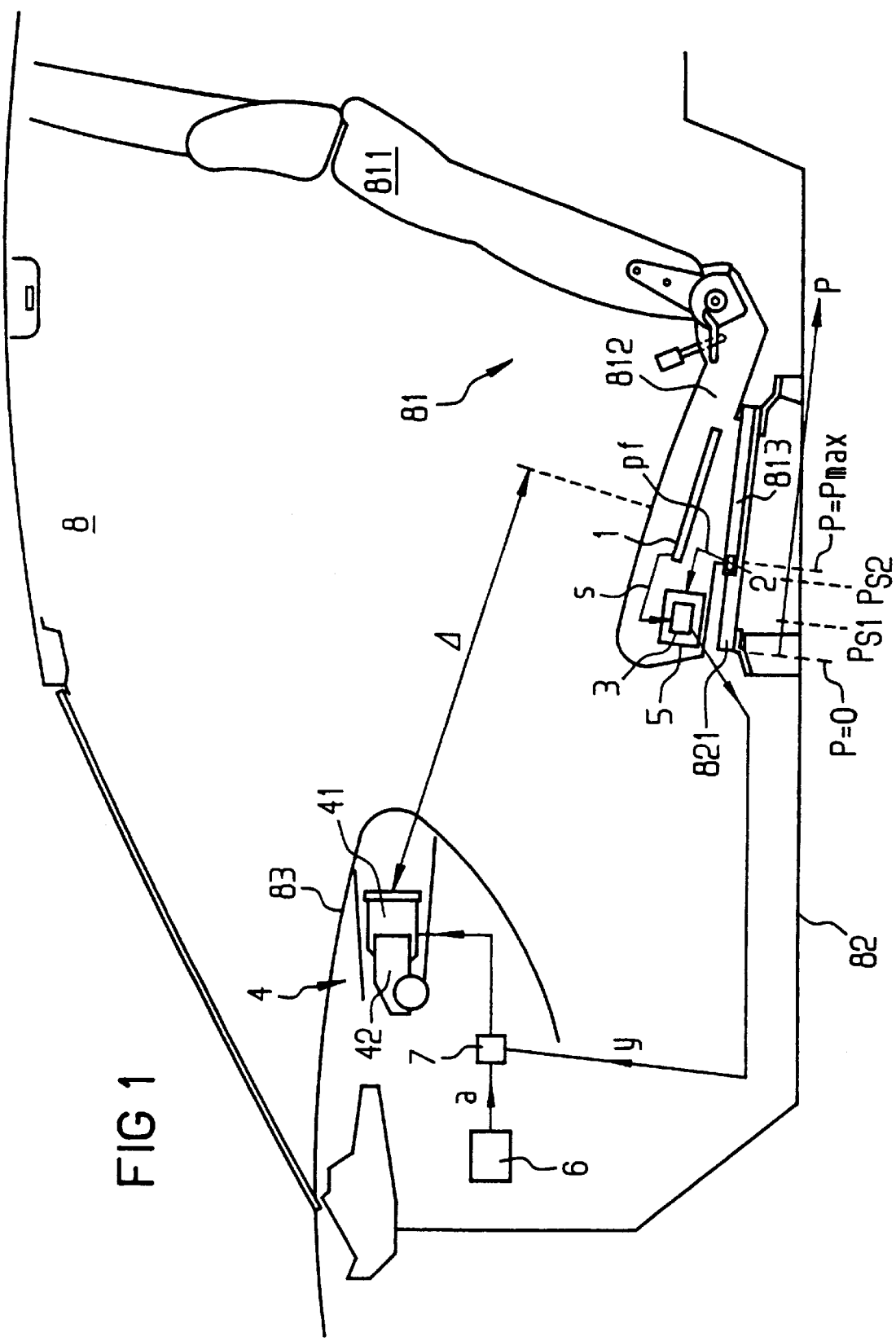
FIG. 1 is a diagrammatic, sectional view of a front portion of a vehicle passenger compartment with a control apparatus according to the invention.

In all the figures of the drawing, sub-features and integral parts that correspond to one another bear the same reference symbol in each case. Referring now to the figures of the drawings in detail and first, particularly, to FIG. 1 thereof, there is shown a front portion of a passenger compartment 8 in cross section. The front portion has a vehicle seat 81 with a body 812 and a backrest 811, and a covering 83 as a dashboard, which is lengthened on the front passenger side. The vehicle seat 81 is slidably supported, via a seat rail 813, on a rail 821 anchored to the vehicle floor 82. The vehicle seat 81 is adjustable longitudinally, that is, essentially parallel to the longitudinal axis of the vehicle, between a first position p=0, as the position with the least distance from the covering 83, and a second position $P_{max}$ that is spaced farthest apart from the covering 83. A control apparatus has a pickup 2 for determining a position p of the vehicle seat 81. Such a pickup 2 is disclosed for instance in Published, European Patent Disclosure EP 0 357 225 A1, which correspond to U.S. Pat. No. 5,618,056 and is hereby incorporated by reference.

A device or detector 1 for detecting a child seat and a control unit 5, which contains an evaluation device 3, are also disposed in the vehicle seat body 812. Besides the evaluation device 3, the control unit 5 includes an electric power supply for the evaluation device 3 and suitable interfaces for data transmission. The device 1 for detecting the child seat furnishes a status signal s to the evaluation device 3; the pickup 2 furnishes a signal pf for the vehicle seat position p detected; and the evaluation device 3 furnishes a control signal y.

Under the covering 83, a restraint device 4 in the form of an air bag 41 is secured to a mount 42. An impact-detecting control device 6 furnishes a tripping signal "a" for the restraint device 4. A logic linkage 7 is connected between the impact-detecting control device 6 and the air bag 41; as its input variables, it has the tripping signal "a" of the impact-detecting control device 6 and the control signal y of the evaluation device 3. The control signal y cannot by itself lead to tripping of the restraint device 4. It can only enable or block the tripping signal "a" furnished by the impact-detecting control device 6.

The device 1 for detecting the child seat is preferably embodied in accordance with the Published European Patent Application EP 0 708 002 A1 which corresponds to U.S. Pat. No. 5,618,056 and, therefore, is incorporated by reference. The device 1 can furnish different status signals s, such as a status signal s2 if a forward-facing child seat is detected on the vehicle seat 81, or a status signal s3 if a rear-facing child seat is detected on the vehicle seat 81. For the invention, however, it is sufficient if the device 1 for detecting the child seat furnishes a status signal s1 by which a child seat disposed on the vehicle seat 81 is detected, regardless of its orientation.

The device 1 for detecting the child seat can preferably additionally furnish a further status signal s4, if a child seat is detected that is facing neither forward nor backward but is shifted or rotated out of position instead. The invention is not tied to a specific embodiment of the device 1 for detecting the child seat. Any arbitrary device can be used, regardless of the principle in physics on which it is based and regardless of where it is installed. In each case, the device 1 for detecting the child seat must detect whether the child seat is disposed on the vehicle seat, or not. Still, for the sake of an optimal tripping strategy for the restraint device, additional information, especially regarding the orientation of the child seat, is quite advantageous.

Especially if the device 1 for detecting the child seat is disposed in the vehicle seat 81, whether in the seat back 811 or the seat body 812, it is advantageous, because of the pickup 2 for the position of the vehicle seat 81 that is disposed in or on the vehicle seat 81, for the evaluation device 3 also to be disposed in or on the vehicle seat 81. The evaluation device 3 is preferably embodied as a microprocessor, which processes the incoming signals s, pf and outputs the control signal y as a function of the seat position p detected and as a function of the status signal s. Still other sensors for picking up other parameters of the vehicle seat 81, such as for the angle of inclination of the seat back 811, and other actuators, such as electric motors for adjusting the angle of inclination of the seat back 811, are preferably electrically connected to the evaluation device 3. The vehicle seat 81 thus has a single evaluation device 3 for all the electrical functions in the vehicle seat. The control signal y is preferably delivered to a vehicle bus system via a suitable interface.

FIG. 2 shows a truth table, which is merely an example but is based on actual practice, showing the occupation of the control signal y of the control apparatus of the invention as a function of the occupation of the status signal s of the device 1 for detecting a child seat and as a function of the detected vehicle seat position p. The control signal y occupied by a 1 is evaluated as an enable signal, and the control signal y occupied by a 0 is evaluated as a blocking signal for the tripping signal "a". An asterisk in the table of FIG. 2 stands for an arbitrary occupation of the corresponding signal. In table I), the device 1 for detecting the child seat can distinguish only between the presence of the child seat (s1=1) and the absence of a child seat (s1=0). In table II), a distinction can be made between a forward-facing child seat (s2=1), a rear-facing child seat (s3=1), and a child seat disposed in some other way (s4=1).

In table I), in FIG. 2, the tripping of the restraint device 4 is enabled whenever no child seat is detected, or when a child seat and at the same time a vehicle seat position p that for instance exceeds a threshold value $P_{s2}$ is exceeded. The exceeding of the threshold value $P_{s2}$ means that the vehicle seat has assumed a position which is located behind a position on the vehicle seat 81 characterized by the threshold value $P_{s2}$. The vehicle seat 81, and thus a child seat disposed on the vehicle seat 81, are far enough away, by a minimum spacing Δ, from the covering 83 that an inflation of the air bag 41 can no longer have a harmful effect on a child in the child seat. In the dimensioning of the threshold value $P_{s2}$ and threshold values described below, factors that must be taken into account include, among others, the range of adjustment of the vehicle seat 81, the size of the child seats that may be placed there, and the size or range of the air bag 41 in the inflated state.

In table II), the control signal y acts as an enable signal, if no child seat is detected or it a forward-facing child seat is detected and the vehicle seat position p is greater than a first threshold value $P_{s1}$, or if a rear-facing child seat is detected and the vehicle seat position p is greater than a second threshold value $P_{s2}$. In order still to permit tripping, with a forward-facing child seat, the vehicle seat 81 can thus be allowed to be closer to the covering 83 than with a rear-facing child seat.

We claim:

1. A control apparatus for a restraint device in a motor vehicle, comprising:

a detector for detecting a child seat disposed on a vehicle seat and outputting a status signal;

a pickup for determining a position of the vehicle seat; and an evaluation device generating a control signal in dependence on the position of the vehicle seat and in dependence on the status signal furnished by said detector, the control signal to be logically linked with a triggering signal output by an impact-detecting control device for triggering a restraint device, wherein said control signal is an enable signal for the triggering signal, if the child seat and at a same time a vehicle seat position, characterizing a minimum spacing between the vehicle seat and the restraint device, is detected;

wherein said detector is disposed in the vehicle seat.

2. The control apparatus according to claim 1, wherein said detector for detecting the child seat furnishes a defined status signal whenever the child seat is detected on the vehicle seat.

3. The control apparatus according to claim 1, wherein said detector for detecting the child seat furnishes a defined status signal whenever a forward-facing child seat is detected on the vehicle seat.

4. The control apparatus according to claim 1, wherein said detector for detecting the child seat furnishes a defined status signal whenever a rear-facing child seat is detected on the vehicle seat.

5. The control apparatus according to claim 1, wherein said pickup and said evaluation device are disposed in the vehicle seat.

6. The control apparatus according to claim 1, wherein the control signal is an enable signal for the triggering signal, if said detector for detecting the child seat does not detect any child seat.

7. The control apparatus according to claim 1, wherein the control signal is an enable signal for the triggering signal, if a forward-facing child seat and at a same time a vehicle seat position, characterizing a minimum spacing between the vehicle seat and the restraint device, is detected.

8. In combination with a restraint device having an impact-detecting device outputting a triggering signal, a control apparatus for controlling the restraint device, the control apparatus comprising:

a detector for detecting a child seat disposed on a vehicle seat and outputting a status signal;

a pickup for determining a position of the vehicle seat;

an evaluation device generating a control signal in dependence on the position of the vehicle seat and in dependence on the status signal furnished by said detector; and a logical link electrically connected to the restraint device and receiving the control signal and the triggering signal output by the impact-detecting control device, said logical link outputting a tripping signal for controlling the restraint device;

wherein said detector is disposed in the vehicle seat.

9. A control apparatus for a restraint device in a motor vehicle, comprising:

a detector for detecting a child seat disposed on a vehicle seat and outputting a status signal;

a pickup for determining a position of the vehicle seat; and an evaluation device generating a control signal in dependence on the position of the vehicle seat and in dependence on the status signal furnished by said detector, the control signal to be logically linked with a triggering signal output by an impact-detecting control device for triggering a restraint device, wherein said control signal is an enable signal for the triggering signal, if the child seat and at a same time a vehicle seat position, characterizing a minimum spacing between the vehicle seat and the restraint device, is detected;

wherein said detector is disposed at the vehicle seat.

10. The control apparatus according to claim 9, wherein said detector for detecting the child seat furnishes a defined status signal whenever the child seat is detected on the vehicle seat.

11. The control apparatus according to claim 9, wherein said detector for detecting the child seat furnishes a defined status signal whenever a forward-facing child seat is detected on the vehicle seat.

12. The control apparatus according to claim 9, wherein said detector for detecting the child seat furnishes a defined status signal whenever a rear-facing child seat is detected on the vehicle seat.

13. The control apparatus according to claim 9, wherein said pickup and said evaluation device are disposed at the vehicle seat.

14. The control apparatus according to claim 9, wherein the control signal is an enable signal for the triggering signal, if a forward-facing child seat and at a same time a vehicle seat position, characterizing a minimum spacing between the vehicle seat and the restraint device, is detected.

15. The control apparatus according to claim 9, wherein the control signal is an enable signal for the triggering signal, if said detector for detecting the child seat does not detect any child seat.

* * * * *